(12) United States Patent
Wassermann et al.

(10) Patent No.: US 8,373,306 B2
(45) Date of Patent: Feb. 12, 2013

(54) ADAPTIVE AND MODULAR UPS SYSTEM AND METHOD

(75) Inventors: Michael Wassermann, Delaware, OH (US); Daniel H. Buss, Columbus, OH (US); Richard J. Zajkowski, Powell, OH (US); William W. Campbell, Westerville, OH (US)

(73) Assignee: Liebert Corporation, Columbus, OH (US)

( * ) Notice: Subject to any disclaimer, the term of this patent is extended or adjusted under 35 U.S.C. 154(b) by 641 days.

(21) Appl. No.: 12/581,956

(22) Filed: Oct. 20, 2009

(65) Prior Publication Data

US 2010/0138586 A1 Jun. 3, 2010

Related U.S. Application Data

(60) Provisional application No. 61/106,756, filed on Oct. 20, 2008.

(51) Int. Cl.
*H02J 7/00* (2006.01)
*H02J 9/00* (2006.01)

(52) U.S. Cl. .......................................... 307/66
(58) Field of Classification Search ............... 307/66
See application file for complete search history.

(56) References Cited

U.S. PATENT DOCUMENTS 6,563,048 B2 * 5/2003 Holt et al. ............... 174/50
2006/0167569 A1 7/2006 Colombi et al.

FOREIGN PATENT DOCUMENTS

WO WO 01/37395 A1 5/2001

OTHER PUBLICATIONS

IEEE Recommended Practice for Electric Power Systems in Commercial Buildings, Anonymous, IEEE Std 241-1990, Sep. 18, 1991, XP002572169, pp. 130-143, IEEE, Piscataway, NJ.
IEEE Guide for Protective Relaying of Utility-Consumer Interconnections, Anonymous, IEEE Std C37.95-2002 (Revision of IEEE Std C37.95-1989), IEEE Standard, Jan. 1, 2003, XP017601689, ISBN 978 0 7381 3516 8, pp. 13-16, figures 7-9, IEEE, Piscataway, NJ.
PCT International Search Report dated Apr. 8, 2010.
PCT Written Opinion of the International Searching Authority dated Apr. 8, 2010.

* cited by examiner

*Primary Examiner* — Hal Kaplan
(74) *Attorney, Agent, or Firm* — Harness, Dickey & Pierce, P.L.C.

(57) ABSTRACT

An uninterruptible power supply (UPS) system that may incorporate a battery subsystem including at least one battery for generating electrical power, and a UPS subsystem including at least one power module. At least one first bus system may couple the battery subsystem to the UPS subsystem to supply electrical power to the UPS subsystem. An input and output (I/O) subsystem is in communication with an output of the UPS subsystem for generating an output signal. At least one second bus system may be used for coupling the output of the UPS subsystem to the I/O subsystem. At least one of the first and second bus systems may include a pair of parallel coupled, independent busses, and may further have a tie bar for enabling the pair of busses to be reconfigured as a single bus.

18 Claims, 6 Drawing Sheets

ADAPTIVE AND MODULAR UPS SYSTEM AND METHOD

CROSS REFERENCE TO RELATED APPLICATIONS

The present disclosure claims priority from U.S. provisional patent application Ser. No. 61/106,756, filed Oct. 20, 2008, the disclosure of which is hereby incorporated by reference into the present application.

FIELD

The present disclosure relates to uninterruptible power supply systems, and more particularly to an adaptive uninterruptible power supply system having modular components that can be configured to provide a dual bus or single bus configuration for power connections between various components of the system.

BACKGROUND

The statements in this section merely provide background information related to the present disclosure and may not constitute prior art.

In an uninterruptible power supply ("UPS") system, presently available systems typically make use of connections between a utility power source, battery source or subsystem, and UPS power module(s) or subsystem that provides a single power output to a connected load. This results in a system that can be viewed as having "single" points of failure. By this it is meant that a failure at a single point along any one of the busses connecting the system components or subsystems may cause a failure of the entire system.

Accordingly, a more flexible system with greater safeguards against failure would be highly desirable. This is especially so in applications where the UPS system is responsible for maintaining continuous power to electronic components or subsystems that are critical to a business or other form of organization.

SUMMARY

In one aspect the present disclosure relates to an uninterruptible power supply (UPS) system. The UPS system may incorporate a battery subsystem including at least one battery for generating electrical power, and a UPS subsystem including at least one power module. At least one first bus system may couple the battery subsystem to the UPS subsystem to supply electrical power to the UPS subsystem. An input and output (I/O) subsystem is in communication with an output of the UPS subsystem for generating an output signal. At least one second bus system may be used for coupling the output of the UPS subsystem to the I/O subsystem. At least one of the first and second bus systems may include a pair of parallel coupled, independent busses, and may further have a tie bar for enabling the pair of busses to be reconfigured as a single bus.

In another aspect the present disclosure may relate to an uninterruptible power supply (UPS) system having a battery subsystem including at least one battery for generating electrical power. A UPS subsystem may be incorporated that includes at least one power module. At least one first bus system has a first pair of parallel arranged, independent busses coupling the battery subsystem to the UPS subsystem to supply electrical power to the UPS subsystem. An input and output (I/O) subsystem may be in communication with an output of the UPS subsystem for generating an output signal. At least one second bus system may be incorporated that has a second pair of parallel arranged, independent busses for coupling the output of the UPS subsystem to the I/O subsystem. At least one of the first and second bus systems may have a tie bar that enables one of the first and second bus systems to be reconfigured as a single bus system.

In still another aspect the present disclosure may relate to a method for forming an uninterruptible power supply (UPS) system. The method may involve providing a battery subsystem including at least one battery for generating electrical power. The battery system may be used to supply electrical power to a UPS subsystem. At least one first bus system may be used to couple the battery subsystem to the UPS subsystem to supply electrical power to the UPS subsystem. An input and output (I/O) subsystem may be used and placed in communication with an output of the UPS subsystem for generating an output signal. At least one second bus system may be used to couple the output of the UPS subsystem to the I/O subsystem. At least one of the first and second bus systems may be configured as a pair of independent busses. And the one of the first and second bus systems configured as a pair of independent busses may be further configured to incorporate a tie bar for enabling the pair of busses to be reconfigured as a single bus.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
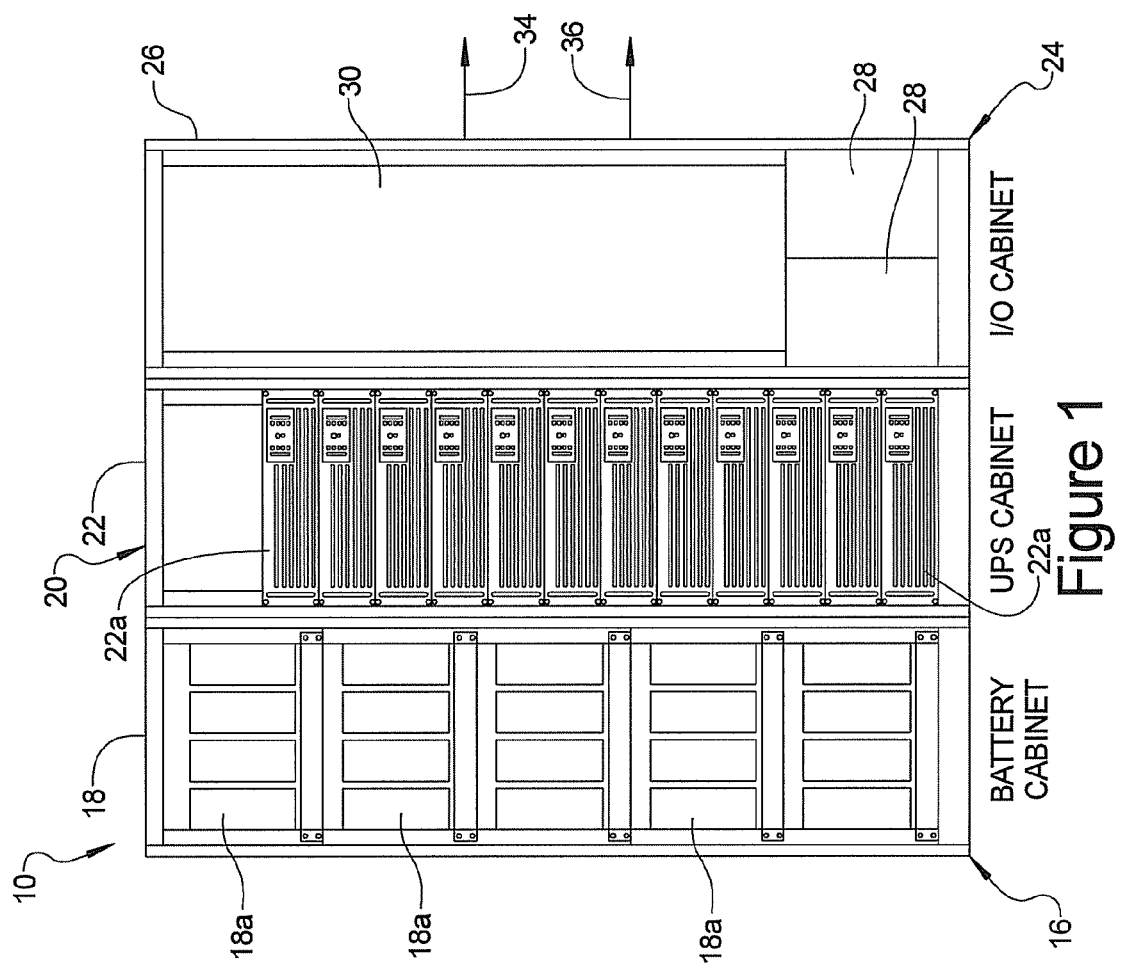
FIG. 1 is an illustration of an uninterruptible power supply system ("UPS") shown in accordance with one embodiment of the present disclosure.

The following description is merely exemplary in nature and is not intended to limit the present disclosure, application, or uses. It should be understood that throughout the drawings, corresponding reference numerals indicate like or corresponding parts and features.

The present disclosure relates to a modular, uninterruptible power supply ("UPS") system that has an architecture that enables it to be readily configured to provide a single bus structure between various components, or a dual bus structure between the various components. A UPS system 10 of the present disclosure is shown in one embodiment in FIG. 1. In this embodiment the system 10 may be used to provide power to electronic components or subsystems. The UPS system 10 may include a battery subsystem 16, which is shown in this exemplary embodiment in one cabinet 18. The battery subsystem 16 may include a plurality of batteries 18a, the precise number of which will vary depending on the power needs of the equipment being supported by the UPS system 10.

The UPS system 10 may also include a UPS subsystem 20 contained in its own cabinet 22. In this example the cabinet 22 may include a plurality of independent, rack mountable power modules 22a. The number of power modules 22a selected for use will be a function of the physical size of each power module 22a, the required power output from the UPS system 10 and the level of redundancy desired. More than one cabinet may be used for each of the battery subsystem 16 and the UPS subsystem 20 depending upon the total number of components being housed in these cabinets. Also, the battery subsystem 16 may be contained within the UPS cabinet 22.

Figure 2:
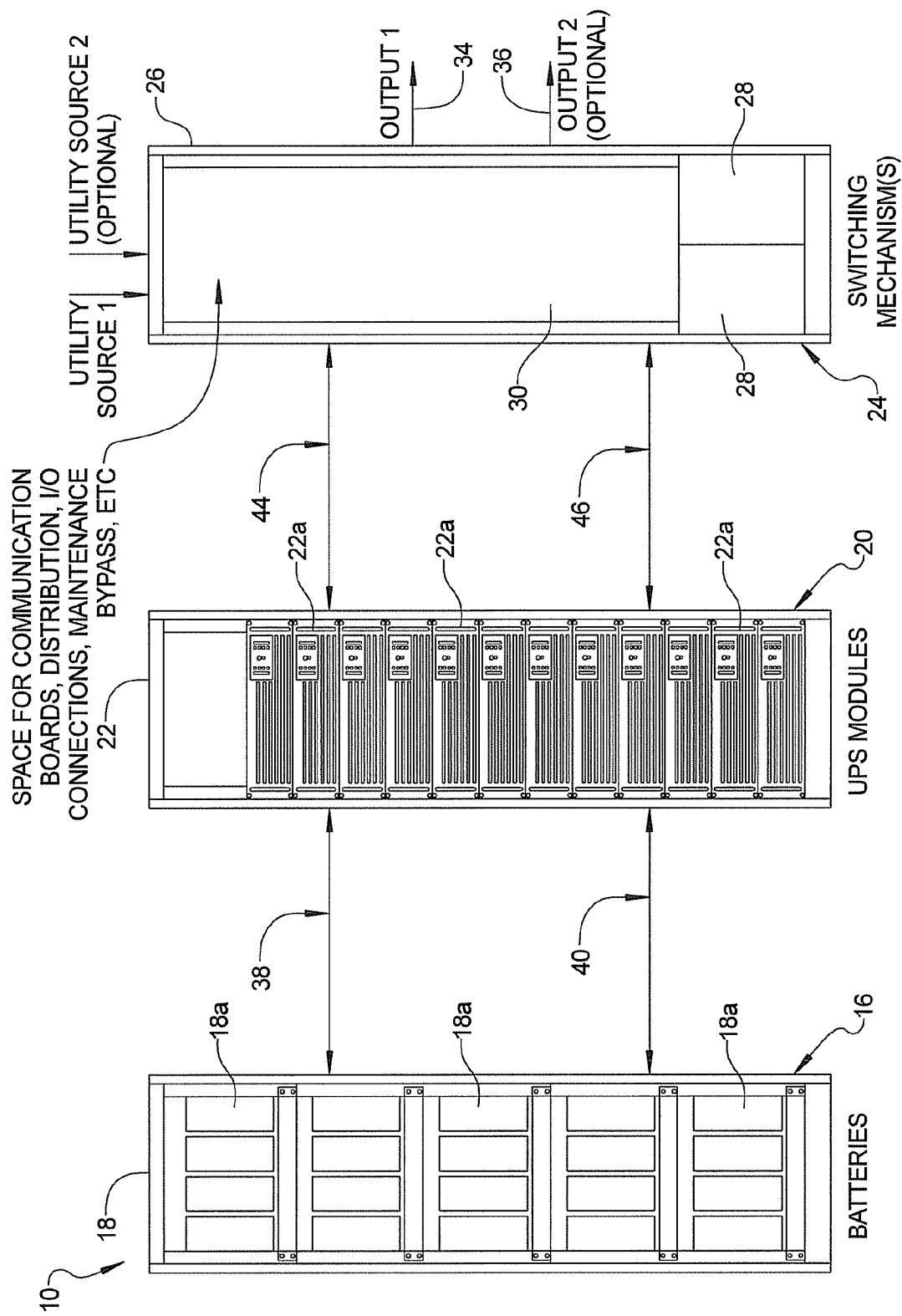
FIG. 2 is a diagram of the UPS system shown in FIG. 1 but illustrating in greater detail certain components used in the various subsystems of the UPS system.

Referring to FIGS. 1 and 2, the UPS system 10 may also include an input/output (I/O) subsystem 24 housed in an I/O cabinet 26. The I/O cabinet 26 may include a plurality of switching mechanisms 28 and space for communication boards, distribution, I/O connections, and/or maintenance bypass. As will be explained further in the following paragraphs, the I/O subsystem 24 may be configured to provide either a single output 34, or dual outputs 34 and 36. For example, a UPS system 10 configured to produce a single output 34 could also be configured to provide dual outputs 34 and 36 at the I/O subsystem 24. The UPS system 10 could provide two times the power output in a single output 34 versus a dual output 34 and 36. Alternatively, whether configured for a single output 34 or for dual outputs 34 and 36, the UPS system 10 may be configured to provide an N+x configuration where power modules 22a that are not required to maintain sufficient output power 34 and 36 can provide a desired level of redundancy. N+x represents the required number of power modules and the number of redundant power modules, where N is the number of modules required and x is the number of redundant power modules.

Figure 3:
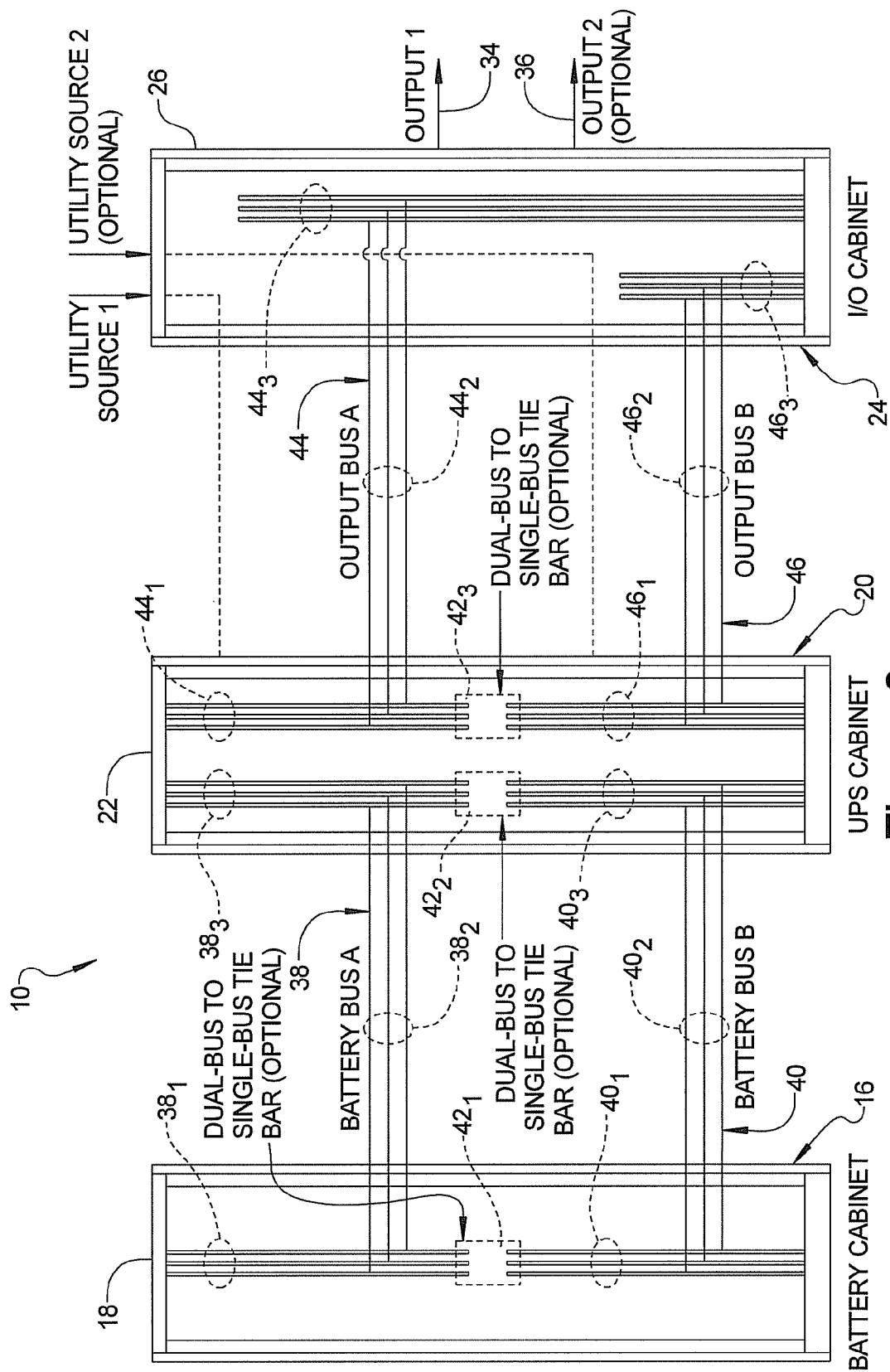
FIG. 3 is a more detailed diagram of the busses interconnecting the battery subsystem, the UPS subsystem and the Input/Output (I/O) subsystems shown in FIG. 2.

Referring to FIG. 3, the battery subsystem 16 is coupled to the UPS subsystem 20 via independent first and second busses 38 and 40. An optional tie bar $42_1$ and/or $42_2$ may be used to physically and electrically couple the busses 38 and 40 together to form a single bus. The UPS subsystem 20 is coupled to the I/O subsystem 24 by independent third and fourth busses 44 and 46, respectively. An optional tie bar $42_3$ may be used to physically and electrically couple the busses 44 and 46 together to form a single bus. Busses 38 and 40 may be viewed as "battery busses" and busses 44 and 46 may be viewed as "output busses". Without any tie bars 42, busses 38 and 44 form essentially a first bus system, and busses 40 and 46 form essentially a completely independent second bus system.

With further reference to FIG. 3, bus 38 includes components $38_1$, $38_2$ and $38_3$ that electrically form a single bus. Bus 40 includes components $40_1$, $40_2$ and $40_3$ that electrically form a single bus. Bus 44 includes components $44_1$, $44_2$ and $44_3$ that electrically form a single bus. And bus 46 includes components $46_1$, $46_2$ and $46_3$ that electrically form a single bus.

The use of two independent bus systems within the UPS system 10 eliminates the risk that a single point of failure on a conventional single bus system may interrupt the supply of power from a UPS subsystem 20 made up of power modules 22a to the I/O subsystem 24. By using two completely independent power bus systems 38/44 and 40/46, a failure of one bus system will still allow power to be provided to the I/O subsystem 24 through the remaining, functioning bus system. Nevertheless, the UPS system 10 can still be configured as a single bus system, via tie bars $42_1$, $42_2$ and $42_3$ or within the I/O subsystem 24.

The busses 38, 40, 44 and 46 may each be formed by conductive bars, conductive cables or any other suitable method of connection. Furthermore each bus 38, 40, 44 and 46 will typically include a plurality of independent conductors to enable the system 10 to function as a power supply system with multiple phases.

Figure 4:
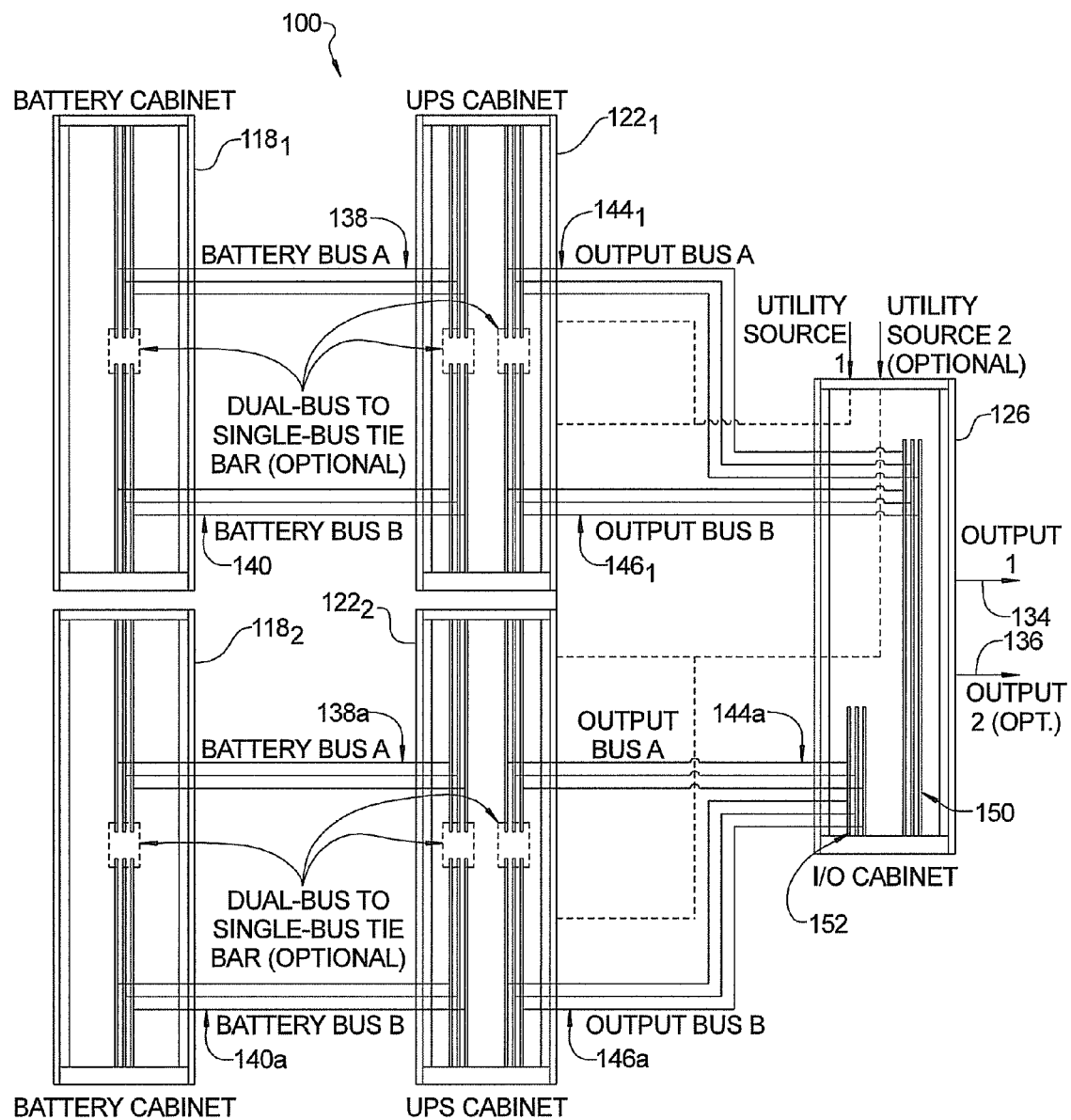
FIG. 4 is an illustration of a UPS system having a parallel bus arrangement where a first pair of output busses are coupled in parallel to provide a first output at an I/O subsystem, and a second pair of output busses that are coupled in parallel to provide a second output at the I/O subsystem.

Referring to FIG. 4, a parallel bus embodiment 100 of the UPS system 10 is shown. In this embodiment components in common with those of the UPS system 10 in FIGS. 1-3 are designated with reference numerals increased by 100 over the numbers used for the corresponding components in UPS system 10. This embodiment makes use of at least two battery cabinets $118_1$ and $118_2$ and at least two UPS cabinets $122_1$ and $122_2$. Although not shown explicitly in the drawing, the battery cabinets 118 will each include a plurality of battery modules such as battery modules 18a, while each of the UPS cabinets 122 will each contain a plurality of power modules such as power modules 22a.

The UPS cabinet $122_1$ and battery cabinet $118_1$ are coupled by a first battery bus 138 and an independent second battery bus 140. However, in this embodiment output busses $144_1$ and $146_1$ are tied in parallel to a first bus 150 within the I/O cabinet 126. Similarly, battery cabinet $118_2$ and the UPS cabinet $122_2$ are coupled by an independent first battery bus 138a and a second battery bus 140a. The UPS cabinet $122_2$ provides power to a bus 152 in the I/O cabinet 124 via a first output bus 144a and an independent second bus 146a. Again, however, the busses 144a and 146a are tied together in parallel to a separate bus 152 within the I/O cabinet 126. Thus, busses 138, 140, $144_1$ and $146_1$ cooperatively provide power to bus 150, which forms a first output 134. Similarly, busses 138a, 140a, 144a and 146a provide power to bus 152, which forms a second output 136. It will be appreciated that each of the busses 138, 140, $144_1$, $146_1$, 138a, 140a, 144a, 146a, 150 and 152 will include a suitable isolation barrier or insulating material between individual bus lines to prevent fault propagation from one bus to another. The system 100, as well as the system 10, is able to operate with an intelligent paralleling scheme. An intelligent paralleling scheme would involve maximizing operating efficiency, in part by enabling control logic used in the systems 100 or 10 to engage the lowest number of power modules 22a required and will idle excess capacity modules. The systems 100 or 10 may profile loads to learn off-peak days and times and adaptively schedule modules 22a to take off-line. The system 100 or 10 may also track each power module's 22a off-line hours and schedule other modules to be off-line to distribute the operating hours between all modules.

Figure 5:
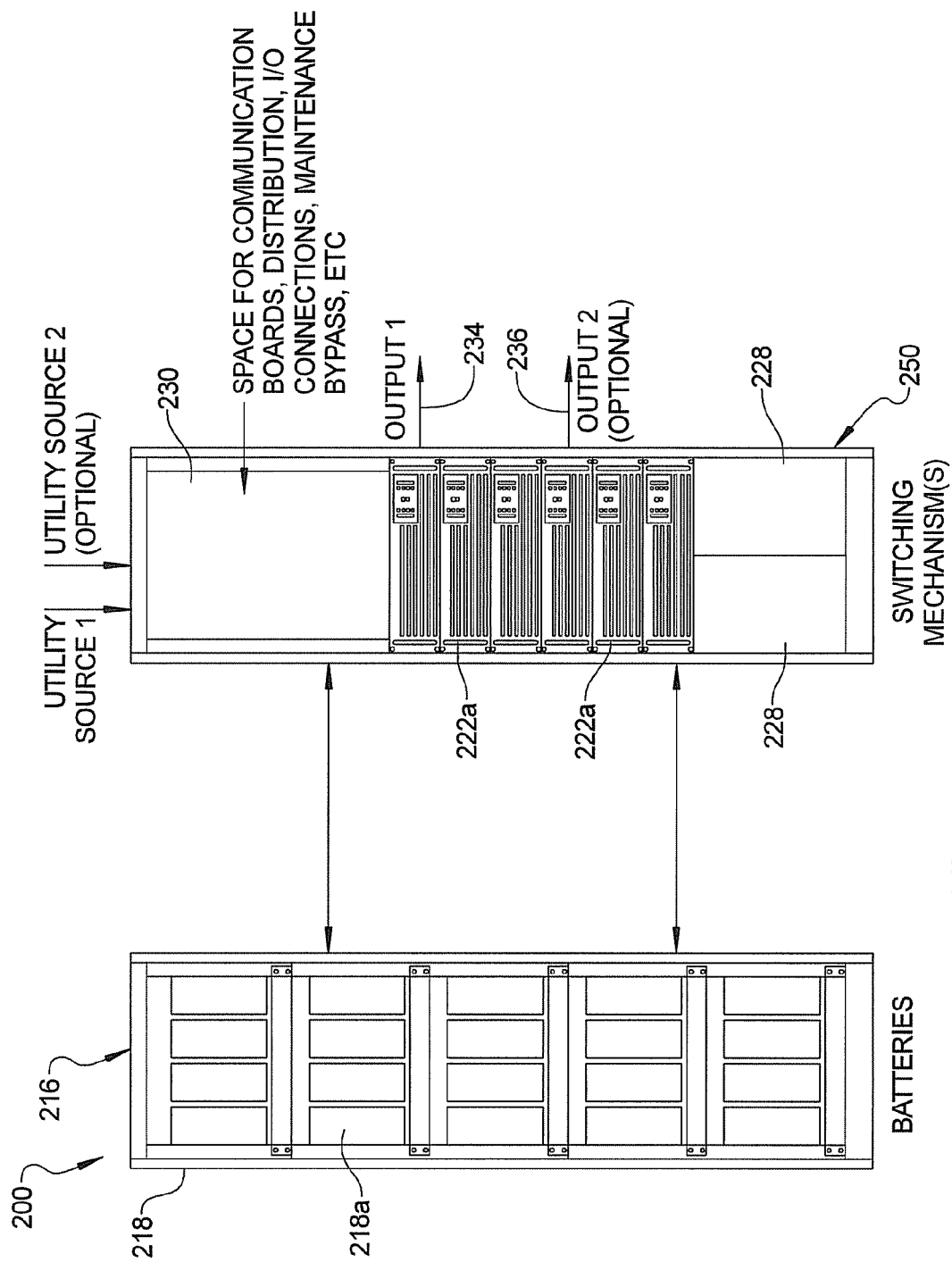
FIG. 5 is an illustration of another embodiment of the present disclosure wherein the UPS power modules and the I/O components are located in a single cabinet.

Referring now to FIG. 5, another system 200 in accordance with another embodiment of the present disclosure is provided. In this embodiment components in common with the system 10 have been denoted with reference numerals increased by 200. The system 200 makes use of a battery cabinet 218 for housing a battery subsystem 216 having a plurality of batteries 218a. A cabinet 250 may house a plurality of switching mechanisms 228, a plurality of power modules 222a and space 230 for communication boards, distribution, I/O connections, and/or maintenance bypass. Cabinet 250 thus effectively houses a UPS subsystem and an I/O subsystem.

Figure 6:
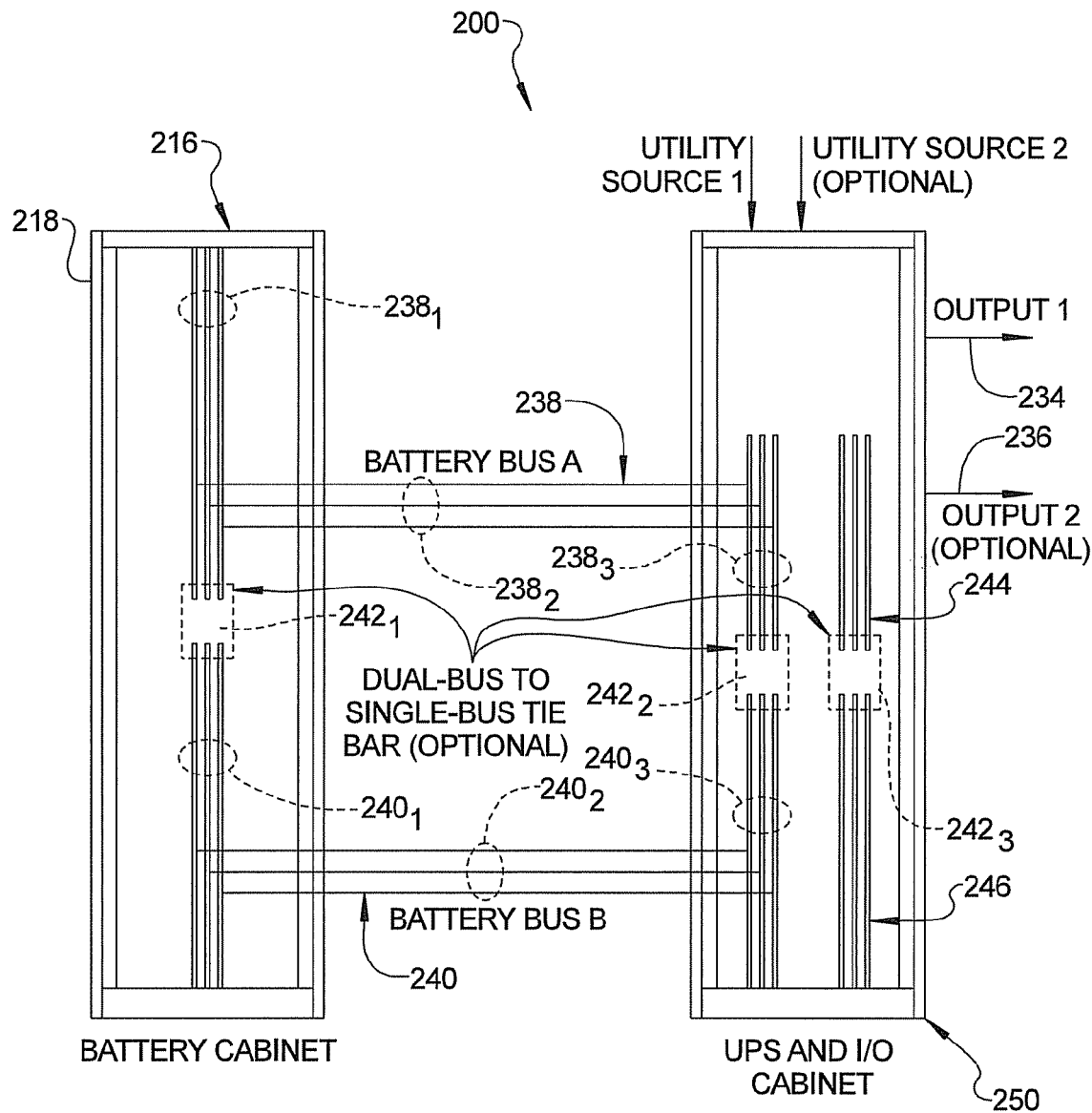
FIG. 6 is a more detailed diagram of the busses interconnecting the battery subsystem, the UPS subsystem and the Input/Output (I/O) subsystems shown in FIG. 5.

In FIG. 6 the battery subsystem 216 is coupled to the UPS subsystem and I/O subsystem 250 via independent first and second busses 238 and 240. The UPS subsystem and I/O subsystem 250 utilize independent third and fourth busses 244 and 246, respectively. Busses 238 and 240 may be viewed as "battery busses" and busses 244 and 246 may be viewed as "output busses". Without any tie bars 242, busses 238 and 244 form essentially a first bus system to provide output 234, and busses 240 and 246 form essentially a completely independent second bus system to provide output 236. An optional tie bar $242_1$ and/or $242_2$ may be used to physically and electrically couple the busses 238 and 240 together to form a single bus. An optional tie bar $242_3$ may be used to physically and electrically couple the busses 244 and 246 together to form a single bus. With the use of a tie bar 242 or single output configuration of the I/O subsystem 250, the system 200 provides a single output 234.

With further reference to FIG. 6, bus 238 includes components $238_1$, $238_2$ and $238_3$ that electrically form a single bus. Bus 240 includes components $240_1$, $240_2$ and $240_3$ that electrically form a single bus. The system 200 embodiment illustrates that a dual bus system can still be easily converted to a single bus system with only minor internal modifications to the independent busses used in the battery cabinet 218 and/or I/O subsystem 250.

From FIGS. 3, 4 and 6, it will be appreciated that the systems 10, 100 and 200 disclosed herein may be configured as a "single input—dual output" system, as a "single input—single output" system, as a "dual input—dual output" system, or as a "dual input—single output" system.

The various embodiments of the present disclosure thus provide an adaptive, modular system that is able to provide a plurality of different bus arrangements for use in a UPS system. The various embodiments are able to provide either two independent power busses by which power can be delivered to an I/O subsystem, or a single bus system for providing power. The various embodiments are easily reconfigurable from dual-to-single bus, or single-to-dual bus. This can be accomplished either in a factory environment or while the UPS system is on-site where it is being used (by qualified personnel). The various embodiments can all be used with different numbers of power modules and can provide different levels of redundancy to meets the needs of a variety of applications. The various embodiments can all be configured to provide one or two outputs from an I/O subsystem.

The examples illustrate the various embodiments and are not intended to limit the present disclosure. Therefore, the description and claims should be interpreted liberally with only such limitation as is necessary in view of the pertinent prior art.

What is claimed is:

1. An uninterruptible power supply (UPS) system comprising:
a battery subsystem including a plurality of batteries for generating electrical power;
a UPS subsystem including a plurality of UPS power modules;
at least one first bus system coupling the battery subsystem to the UPS subsystem to supply electrical power to the UPS subsystem;
an input and output (I/O) subsystem in communication with an output of the UPS subsystem for generating an output signal;
at least one second bus system for coupling the output of the UPS subsystem to the I/O subsystem; and
wherein at least the first bus system includes a pair of parallel coupled, independent busses; and
wherein the first bus system further includes first and second tie bars for enabling the pair of busses to be selectively reconfigured relative to the UPS power modules; and further such that selective use of the first and second tie bars enables:
all of an output from the battery subsystem to be applied to a first subportion of the UPS power modules; and
all of the output from the battery subsystem to be applied to a second subportion of the UPS power modules; and
a portion of all the output from the battery subsystem to be applied simultaneously to all the UPS power modules when the first tie bar is not in use and the second tie bar is in use.

2. The UPS system of claim 1, wherein the battery subsystem and the UPS subsystem each have a cabinet for housing portions of the first bus system.

3. The UPS system of claim 1, wherein the second bus system has a tie bar enabling the first and second bus systems to be configured as a single bus system.

4. The UPS system of claim 1, wherein the I/O subsystem comprises independent first and second outputs.

5. The UPS system of claim 1, wherein the I/O subsystem is configurable to provide either:
independent first and second outputs; or
a single output that is the sum of the first and second outputs.

6. The UPS system of claim 1, wherein the UPS subsystem and the I/O subsystem are housed in a single cabinet.

7. The UPS system of claim 1, wherein:
the I/O subsystem is housed in a cabinet;
the second bus system includes a first bus component associated with the UPS subsystem and a second bus component disposed within the I/O cabinet; and
the I/O subsystem provides independent first and second outputs.

8. The UPS system of claim 7, wherein the second bus system includes an additional tie bar, and wherein when the additional tie bar is used to configure the second bus system as a single bus system.

9. The UPS system of claim 1, wherein:
the battery subsystem is located in a battery cabinet;
the UPS subsystem is located in a UPS cabinet; and
the first bus system includes bus components located in the battery cabinet and the UPS cabinet.

10. The UPS system of claim 1, wherein:
the UPS subsystem is located in a UPS cabinet;
the I/O subsystem is located in an I/O cabinet; and
the second bus system includes bus components located in the UPS cabinet and the I/O cabinet.

11. An uninterruptible power supply (UPS) system comprising:
a battery subsystem including at least one battery for generating electrical power;
a UPS subsystem including a plurality of UPS power modules;
at least one first bus system having a first pair of parallel arranged, independent busses coupling the battery subsystem to the UPS subsystem to supply electrical power to the UPS subsystem;
an input and output (I/O) subsystem in communication with an output of the UPS subsystem for generating an output signal;
at least one second bus system having a second pair of parallel arranged, independent busses for coupling the output of the UPS subsystem to the I/O subsystem;

wherein at least the first bus system has first and second tie bars that enable the first bus system to be reconfigured as a single bus system; and selective use of the first and second tie bars enables:
- all of an output from the battery subsystem to be applied to a first subportion of the UPS subsystem; and
- all of the output from the battery subsystem to be applied to a second subportion of the UPS subsystem; and
- a portion of all the output from the battery subsystem to be applied simultaneously to all the UPS power modules when the first tie bar is not in use and the second tie bar is in use.

12. The UPS system of claim 11, wherein the second bus system has an additional tie bar that helps to enable the first and the second bus systems to be configured as a single bus system.

13. The UPS system of claim 11, wherein said first bus system includes bus components associated with each of the battery subsystem and the UPS subsystem.

14. The UPS system of claim 11, wherein the second bus system includes bus components associated with each of the UPS subsystem and the I/O subsystem.

15. The UPS system of claim 11, wherein the I/O subsystem includes two independent outputs.

16. The UPS system of claim 11, wherein the UPS subsystem and the I/O subsystem are located in a single cabinet.

17. The UPS system of claim 11, wherein:
- the battery subsystem includes first and second battery subsystems;
- the UPS subsystem includes first and second UPS subsystems;
- the first bus system includes two pairs of bus systems coupling the first battery subsystem with the first UPS subsystem; and
- the second bus system includes two pairs of bus systems coupling the second battery subsystem with the second UPS subsystem.

18. A method for forming an uninterruptible power supply (UPS) system, the method comprising:
- providing a battery subsystem including at least one battery for generating electrical power;
- using the battery subsystem to supply electrical power to a UPS subsystem;
- using at least one first bus system to couple the battery subsystem to the UPS subsystem to supply electrical power to the UPS subsystem;
- using an input and output (I/O) subsystem in communication with an output of the UPS subsystem for generating an output signal;
- using at least one second bus system to couple the output of the UPS subsystem to the I/O subsystem;
- configuring at least one of the first and second bus systems as a pair of independent busses;
- further configuring the first bus system to incorporate first and second tie bars to help enable the pair of busses to be reconfigured as a single bus; and
- selectively using the first and second tie bars to enable:
  - all of an output from the battery subsystem to be applied to a first subportion of the UPS subsystem; and
  - all of the output from the battery subsystem to be applied to a second subportion of the UPS subsystem; and
  - a portion of all of the output from the battery subsystem to be applied simultaneously to all the UPS subsystem when the first tie bar is not in use and the second tie bar is in use.

* * * * *